Patented Sept. 4, 1951

2,566,739

UNITED STATES PATENT OFFICE 2,566,739

VINYL MONOMER COMPOSITIONS STABILIZED AGAINST THE DELETERIOUS EFFECTS OF COPPER AND COPPER COMPOUNDS

Samuel A. Moore, Cincinnati, Ohio, and Peter Kass, Wilmington, Del., assignors to Interchemical Corporation, New York, N. Y., a corporation of Ohio No Drawing. Application November 25, 1947, Serial No. 788,084

6 Claims. (Cl. 260—31.2)

This invention relates to new compositions of matter containing vinyl polymerization monomers and to methods of employing these compositions.

It is known that monomeric styrene, as well as many other vinyl monomers slowly react with or dissolve heavy metals such as nickel, cobalt, lead, copper, etc. The small amount of these metals that goes into solution in the monomer frequently has deleterious effects on the properties of the monomers, and on the resins formed by polymerizing or copolymerizing the monomers. The monomers, for examples, styrene, methyl methacrylate, and vinyl acetate, develop a greenish color when contacted with copper metal for several days at room temperature or in shorter time at elevated temperatures. In addition to this green color being objectionable, in certain instances the presence of the small amount of copper in solution tends to inhibit the polymerization of the monomers, either alone or with other copolymerizable substances.

An object of the present invention is to provide compositions containing vinyl monomer that are stabilized against the deleterious effects of heavy metals and heavy metal compounds, such as copper and its compounds. It is a further object of the invention to provide compositions containing vinyl monomers that polymerize readily even in the presence of heavy metals or heavy metal compounds. Other objects of the invention will become apparent to those skilled in the art from the description of the invention.

The objects of the invention are attained by adding a small amount of an hydroxy polycarboxylic acid, such as malic acid, tartaric acid, or citric acid, to compositions containing the vinyl monomer. The amount of additive required to obtain the results desired will in general be from about 0.05 to about 5% by weight, based on the amount of vinyl monomer used in the composition.

The invention has been found to be applicable to all types of vinyl monomer compositions that have been treated and which tend to become discolored or inhibited by heavy metals. Since this deleterious effect of heavy metals, especially copper and its compounds, is encountered more extensively and has been more troublesome with styrene monomer and compositions containing styrene monomer, the investigations on which the invention is based are concerned primarily with this phase of the problem. However, of the numerous vinyl monomers that exist, vinyl acetate, and diallyl phthalate, in addition to styrene, have been shown to be operable in the invention. Since no vinyl monomer has been found to be inoperable it appears that the invention applies to vinyl monomers in general.

In many instances where compositions containing monomeric styrene are employed to coat or impregnate copper articles with polystyrene or copolymers of styrene with other copolymerizable substances by polymerizing the styrene composition on the copper article, (e. g. for impregnating copper castings, coils, windings, etc.), it has been noted that copper tends to discolor the styrene containing compositions in the impregnating bath and that the resulting impregnating solutions may gradually become more difficult to polymerize. This effect, apparently due to the presence of copper in solution in the composition, is largely overcome by adding a small amount of one of the hydroxy polycarboxylic acid derivatives of the present invention. The hydroxy polycarboxylic acid can be added at any stage in the formulation of the composition.

Also the presence of copper in solution in the monomeric styrene solution may decrease the electrical insulating efficiency of the resulting resin coating. Such effects can be minimized by employing one of the additives of the present invention to prevent the copper from affecting the solution. Also, the adhesion of the resulting resin to copper is frequently improved, especially in the case of copolymer resins formed from styrene and polymerizable polyesters having an acid value of above 10.

As already stated the invention is operable with styrene containing compositions generally. For instance, the additives may be used with pure uninhibited styrene, styrene containing an inhibitor of polymerization (e. g. guaiacol, catechol, or tertiary butyl catechol), styrene containing polymerization promoters such as peroxide, or compositions containing styrene and other copolymerizable substances, especially alkyd resins, with or without other additives such as inhibitors, promoters, solvents, etc.

Monomeric styrene as sold commercially generally contains a small amount of an inhibitor of polymerization to stabilize the monomer during storage and shipping. These inhibitors are in general hydroxy benzenes or derivatives of hydroxy benzenes, such as polyhydroxy benzenes, alkyl derivatives of polyhydroxy benzenes, and alkyl derivatives of phenols. Examples include hydroquinone, resorcinol, tert. butyl catechol, catechol, o-cresol, and guaiacol. Styrene containing one or more of these inhibitors can be used in the compositions of the present invention.

It is often the practice in industrial processes for polymerizing vinyl monomers or vinyl monomer compositions to use peroxides such as benzoyl peroxide, tert. butyl peroxide, lauroyl peroxide and the like, as polymerization catalysts. Such catalysts can be used advantageously in compositions containing the hydroxy polycarboxylic additives of the present invention. The use of peroxide catalysts is particularly advantageous if the compositions are to be polymerized at relatively low temperatures. The use of these catalysts also decreases the baking time where the compositions are to be polymerized at high temperature.

A particularly advantageous application of the compositions of the present invention is as a composition for impregnating porous copper or copper alloy castings to seal the pore. For this use a composition which polymerizes to a 100% solids resin is desired. Also the composition must not be so volatile that it can not be cured by baking. It has been found that monomeric styrene solutions of copolymerizable polyester resins are suitable for this impregnating operation. However, in many instances, the copper of the casting has deleterious effects, as pointed out hereinabove, on the monomeric styrene solution. By employing one of the additives of the present invention in the styrene-polyester compositions the influence of copper on discoloration and polymerization of the composition is largely overcome.

Another application of the invention is in coating copper wire, coils, winding, etc., with polystyrene or styrene copolymers as protective and insulating coatings. Here again it is desirable to coat the copper articles with a composition containing monomeric styrene and polymerize the composition in situ on the copper article. The hydroxy polycarboxylic additives of the present invention facilitate the polymerization of these compositions on the articles. The resultant coatings have good adhesion and good electrical properties.

In applying the invention to compositions comprising monomeric styrene and copolymerizable polyester resins or other vinyl monomers and polyester resins it is preferred that the polyester resin be substantially soluble in the monomer. Polyester resins of this type can be prepared from polyhydric alcohols, and polycarboxylic acids with or without fatty oil acids. Where no fatty oil acid is used it is necessary that the polyhydric alcohol consist for the most part of dihydric alcohol, e. g. ethylene glycol, propylene glycol, diethylene glycol, and the like. And of course for the polyester to be copolymerizable with styrene, at least a portion of the polycarboxylic acid must be alpha, beta-unsaturated polycarboxylic acid such as maleic acid, or fumaric acid. Where the polyester is modified by a fatty oil acid, higher polyhydric alcohols can be used to a certain extent depending upon the extent of fatty oil acid modification.

The fatty oil acids that can be used include the saturated and unsaturated fatty acids having from about 10 to 20 carbon atoms, such as the fatty acids occurring in the animal and vegetable oils. Either the pure acid or mixtures of these acids, such as linseed fatty acids, dehydrated castor oil fatty acid, soya fatty acids, and fish oil fatty acids, can be used.

The following examples in which the parts are by weight unless otherwise stated further illustrate the invention.

*Example I*

To monomeric styrene containing 0.5% of tert. butyl catechol inhibitor was added 0.5% of tartaric acid and several small strips of copper. The styrene had developed no color after six months. A similar monomeric styrene containing 0.5% of tert. butyl catechol and copper strips but without tartaric acid developed a green color after standing a few days. The results were similar where styrene containing catechol inhibitor was used.

The phenomenon of discoloration of styrene and styrene compositions by copper and copper compounds is believed to be due to minute amounts of copper going into solution. Although this discoloration which is apparently due to colored copper compounds in solution or suspension, is itself objectionable in many of the applications in which the styrene compositions are to be used, we believe that the presence of copper compounds in solution is largely responsible for other deleterious effects on the styrene compositions and the resins obtained by polymerizing these compositions. Experiments illustrating the effects that the hydroxy polycarboxylic acid additives have on gel time, or polymerization rate, of styrene compositions and the effect that they have on adhesion of polymerized compositions to copper surfaces are described hereinafter.

*Example II*

An alkyd resin having an acid value of 20 was prepared from 35 parts phthalic anhydride, 10 parts maleic anhydride, 10 parts glycerine, 40 parts diproylene glycol and 5 parts butyl ether of diethylene glycol and dissolved in monomeric styrene containing ½% of tert. butyl catechol inhibitor in the ratio of 40 parts of alkyd to 60 parts of styrene. In the presence of copper wire and 1% of benzoyl peroxide this composition gelled at 60° C. in 72–74 minutes to give a greenish colored casting. A sample of the same composition stabilized with about 1% of tartaric acid gelled at substantially the same rate as the unstabilized composition but gave a clear casting. Similar results were obtained when methyl methacrylate or vinyl acetate was substituted for the styrene in the above formulation.

*Example III*

An alkyd, having an acid number of 20, prepared from 35 parts phthalic anhydride, 35 parts maleic anhydride, 10 parts glycerine, 5 parts butyl Carbitol, and 40 parts dipropylene glycol, and containing 0.05% of tert. butyl catechol was dissolved in monomeric styrene containing ½% of tert. butyl catechol inhibitor in the ratio of 30 parts alkyd to 70 parts of styrene. In the presence of copper and 1% of benzoyl peroxide catalyst this composition gelled at 60% C. in 74 minutes to give a greenish colored casting. Under exactly analogous conditions except that the composition contained 1% of tartaric acid the composition gelled in 76 minutes to give a clear casting.

The data in Table I show the effects of the hydroxy polycarboxylic acids on gel time of a composition consisting of 60% of commercially available inhibited styrene and 40% of a tall oil modified ethylene glycol-maleic anhydride alkyd resin containing 60% of tall oil modified ethylene glycol-maleic anhydride alkyd resin containing 60% of tall oil modification. Gel times were run at 275° F. after the samples had aged in the presence of copper strip for about 12 weeks and at this time all of the samples except the standard were still clear while the standard had become a greenish color.

TABLE I

| Sample Composition | Gel time at 275° F. |
|---|---|
| Standard (40% resin: 60% styrene) | no gel in 90 min. |
| Standard +½% of citric acid | 31 min. |
| Standard +½% of tartaric acid | 30 min. |
| Standard +½% of malic acid | 32 min. |
| Standard +½% of citric acid | 23 min. |
| Standard +1% of tartaric acid | 31 min.[1] |

[1] This sample had aged for only 18 days when this test was made.

The results of the following experiment are typical of the influence that the additives of the present invention have on the adhesion characteristics of resin coatings to copper. A heat-reactive styrene-polyester composition containing no additive was cast around the outside of a copper strip. The force required to remove the copper strip was 17.5 pounds. Under similar conditions using the same casting resin containing ½%, based on polyester resin, of tartaric acid, the force required to remove the copper strip was about 50 pounds.

To those experienced in the art it will be obvious that the present invention of adding an hydroxy polycarboxylic acid to styrene containing compositions will have many applications in the art of employing such compositions in coatings, moldings, castings, and the like. Therefore, the illustrative examples and description of the invention given hereinabove are not intended to limit the invention except as it is defined in the appended claims.

We claim:

1. A composition of matter comprising monomeric vinyl acetate stabilized against the deleterious effects of copper and copper compounds with 0.05 to 5%, based on vinyl acetate, of an hydroxy polycarboxylic acid.

2. A composition of matter comprising a vinyl monomer of the class consisting of styrene, vinyl acetate, and diallyl phthalate solution of a copolymerizable polyhydric alcohol-polycarboxylic acid polyester stabilized against the deleterious effects of copper and copper compounds, with 0.05 to 5%, based on vinyl monomer, of an hydroxy polycarboxylic acid.

3. A composition of matter comprising a monomeric styrene solution of a copolymerizable polyhydric alcohol-polycarboxylic acid polyester, stabilized against the deletrious effects of copper with 0.05 to 5%, based on styrene, of an hydroxy polycarboxylic acid.

4. A composition of matter comprising a monomeric vinyl acetate solution of a copolymerizable polyhydric alcohol-polycarboxylic acid polyester, stabilized against the deleterious effects of copper and copper compounds with 0.05 to 5%, based on vinyl acetate, of an hydroxy polycarboxylic acid.

5. A composition of matter comprising a monomeric styrene solution of a copolymerizable polyhydric alcohol-polycarboxylic acid polyester stabilized against the deleterious effects of copper and copper compounds with 0.05 to 5%, based on styrene, of tartaric acid.

6. A composition of matter comprising a monomeric styrene solution of a copolymerizable polyhydric alcohol-polycarboxylic acid polyester stabilized against the deleterious effects of copper and copper compounds with 0.05 to 5%, based on styrene, of malic acid.

SAMUEL A. MOORE.
PETER KASS.

REFERENCES CITED

The following references are of record in the file of this patent:

UNITED STATES PATENTS

| Number | Name | Date |
|---|---|---|
| 2,228,791 | Soday | Jan. 14, 1941 |